US008593716B1

(12) United States Patent
Thiel et al.

(10) Patent No.: US 8,593,716 B1
(45) Date of Patent: Nov. 26, 2013

(54) METHODS AND APPARATUS FOR PHOTONIC ARBITRARY WAVEFORM GENERATION OVER WIDE-BANDWIDTH AND EXTENDED TIME APERTURES

(75) Inventors: Charles W. Thiel, Bozeman, MT (US); Peter B. Sellin, Bozeman, MT (US); Kristian D. Merkel, Bozeman, MT (US)

(73) Assignee: Montana State University, Bozeman, MT (US)

( * ) Notice: Subject to any disclaimer, the term of this patent is extended or adjusted under 35 U.S.C. 154(b) by 290 days.

(21) Appl. No.: 13/154,416

(22) Filed: Jun. 6, 2011

Related U.S. Application Data

(60) Provisional application No. 61/351,490, filed on Jun. 4, 2010.

(51) Int. Cl.
*G02F 1/23* (2006.01)

(52) U.S. Cl.
USPC ........................................................ 359/278

(58) Field of Classification Search
USPC ........................................................ 359/278
See application file for complete search history.

(56) References Cited

U.S. PATENT DOCUMENTS 7,545,304 B1 * 6/2009 Wu et al. ........................ 341/144

OTHER PUBLICATIONS

Chou et al., "Adaptive RF-Photonic Arbitrary Waveform Generator", "IEEE Photonics Technology Letters", Apr. 2003, pp. 581-583, vol. 15, No. 4.
Cundiff et al., "Optical arbitrary waveform generation", "Nature Photonics", Oct. 29, 2010, pp. 760-766, vol. 4, Publisher: Macmillan Publishers Limited.
Diddams et al., "Direct Link between Microwave and Optical Frequencies with a 300 THz Femtosecond Laser Comb", "Physical Review Letters", May 29, 2000, pp. 5102-5105, vol. 84, No. 22.
Fontaine et al., "32 phasex32 amplitude optical arbitrary waveform generation", "Optics Letters", Apr. 1, 2007, pp. 865-867, vol. 32, No. 7.
Hickey et al., "Generating Microwaves With Diode Lasers", "Lasers & Optronics", Jun. 1993, pp. 15-17.
Jiang et al., "Width and Wavelength—Tunable Optical RZ Pulse Generation and RZ-to-NRZ Format Conversion at 10 GHz Using Spectral Line-by-Line Control", "IEEE Photonics Technology Letters", Dec. 2005, pp. 2733-2735, vol. 17, No. 12.
Jiang et al., "Four-User, 2.5-Gb/s, Spectrally Coded OCDMA System Demonstration Using Low-Power Nonlinear Processing", "Journal of Lightwave Technology", Jan. 2005, pp. 143-158, vol. 23, No. 1.
Jiang et al., "Optical Arbitrary Waveform Generation and Characterization Using Spectral Line-by-Line Control", "Journal of Lightwave Technology", Jul. 2006, pp. 2487-2494, vol. 24, No. 7.
Jiang et al., "Spectral Line-by-Line Pulse Shaping on an Optical Frequency Comb Generator", "IEEE Journal of Quantum Electronics", Dec. 2007, pp. 1163-1174, vol. 43, No. 12.
Miyamoto et al, "Waveform-Controllable Optical Pulse Generation Using an Optical Pulse Synthesizer", "IEEE Photonics Technology Letters", Mar. 1, 2006, pp. 721-723, vol. 18, No. 5.

(Continued)

*Primary Examiner* — James Jones
(74) *Attorney, Agent, or Firm* — Evans & Molinelli PLLC; Eugene J. Molinelli

(57) ABSTRACT

A method and apparatus for producing an arbitrary broadband waveform includes generating a first narrowband waveform and generating a frequency-shifted replica by frequency shifting the first narrowband waveform by a frequency shift. A second narrowband waveform is also generated. A broadband waveform is generated by combining the frequency-shifted replica and the second narrowband waveform.

23 Claims, 17 Drawing Sheets

(56) References Cited

OTHER PUBLICATIONS

Mullen et al., "Application of Radar Technology to Aerial Lidar Systems for Enhancement of Shallow Underwater Target Detection", "IkEE Transactions on Microwave 1 Heoky and Techniques", Sep. 1995, pp. 2370-2377, vol. 43, No. 9.

Oreilly et al., "Remote Delivery of Video Services Using mm-Waves and Optics", "Journal of Lightwave Technology", Feb. 1994, pp. 369-375, vol. 12, No. 2.

Weiner, A. M., "Femtosecond optical pulse shaping and processing", "Prog. Quant. Elect.", 1995, pp. 161-237, vol. 19, Publisher: Pergamon.

* cited by examiner

FIG. 6

|  | Time Aperture | Bandwidth | TBP | Freq. Resolution |
|---|---|---|---|---|
| State of the Art Specifications Surveyed Among Various Solutions | 0.010 to 4 ns | 10 GHz to 1 THz | up to 1024 | down to 100 MHz |
| Practical Specifications with New Solution | up to 100,000 ns | 0 to 100 GHz | up to 10,000,000 | down to 0.010 MHz |

METHODS AND APPARATUS FOR PHOTONIC ARBITRARY WAVEFORM GENERATION OVER WIDE-BANDWIDTH AND EXTENDED TIME APERTURES

CROSS-REFERENCE TO RELATED APPLICATIONS

This application claims benefit of Provisional Appln. 61/351,490, filed Jun. 4, 2006, the entire contents of which are hereby incorporated by reference as if fully set forth herein, under 35 U.S.C. §119(e).

STATEMENT OF GOVERNMENTAL INTEREST

This invention was made with Government support under Contract No. W911NF-10-C-0015 awarded by the Department of the Army. The Government has certain rights in the invention.

BACKGROUND OF THE INVENTION

Optical arbitrary waveform generation (OAWG) is a technique where a photonic device is programmed to create the desired output as an optical waveform which has an arbitrary modulation format that is user specified on demand. Typically this is done from a purely electronic approach, which is limited in bandwidth. OAWG has a wide range of potential and emerging military and commercial applications.

The past approaches described in this section could be pursued, but are not necessarily approaches that have been previously conceived or pursued. Therefore, unless otherwise indicated herein, the approaches described in this section are not to be considered prior art to the claims in this application merely due to the presence of these approaches in this background section.

SUMMARY OF THE INVENTION

Electronic AWG systems meet the requirements of certain applications, but are typically limited in their bandwidth. Some optical AWG systems alleviate the limited bandwidth constraint. However, despite significant investment, the known state-of-the-art OAWG systems suffer from several limitations, including their relatively short duration for non-repetitive waveforms, a slow refresh rate, limited spectral resolution, and a relatively small number of independently controlled frequency channels New OAWG methods are desired that are capable of effective use of wider bandwidth, extended time apertures, high-resolution spectral control of the optical waveforms, long optical coherence lengths, long-term absolute frequency stability, or precise optical phase manipulation, alone or in some combination. Additional desirable properties include systems that incorporate cost-effective low-bandwidth commercial technology with a robust, compact modular system design for efficient mass-production and deployment into a wide range of operation platform.

In a first set of embodiments, a method for producing an arbitrary broadband waveform includes generating a first narrowband waveform and generating a frequency-shifted replica by frequency shifting the first narrowband waveform by a frequency shift. A second narrowband waveform is also generated. A broadband waveform is generated by combining the frequency-shifted replica and the second narrowband waveform.

In a second set of embodiments, a method for producing an arbitrary broadband optical waveform includes generating a first narrowband optical waveform and generating a frequency-shifted replica by frequency shifting the first narrowband waveform by a frequency shift. A second narrowband optical waveform is also generated. A broadband optical waveform is generated by coherently combining the frequency-shifted replica and the second narrowband waveform.

In a third set of embodiments, a method comprises determining a target broadband waveform. The method also comprises determining a spectrum and phase for a first narrowband optical waveform and determining a spectrum and phase for a second narrowband optical waveform. The first and second waveforms are determined so that a frequency-shifted replica of the first narrowband optical waveform coherently combined with the second narrowband optical waveform generates a broadband optical waveform that substantively matches the target broadband waveform.

In a various other sets of embodiments, an apparatus or computer readable medium is configured to perform one or more steps of one or more of the above methods.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 6 is a table that illustrates example specifications for existing state-of-the-art laboratory demonstrations (see for example [ref. 7]) compared to example practical specifications for a new solution, according to an embodiment achievable with current components;

DETAILED DESCRIPTION

Figure 1:
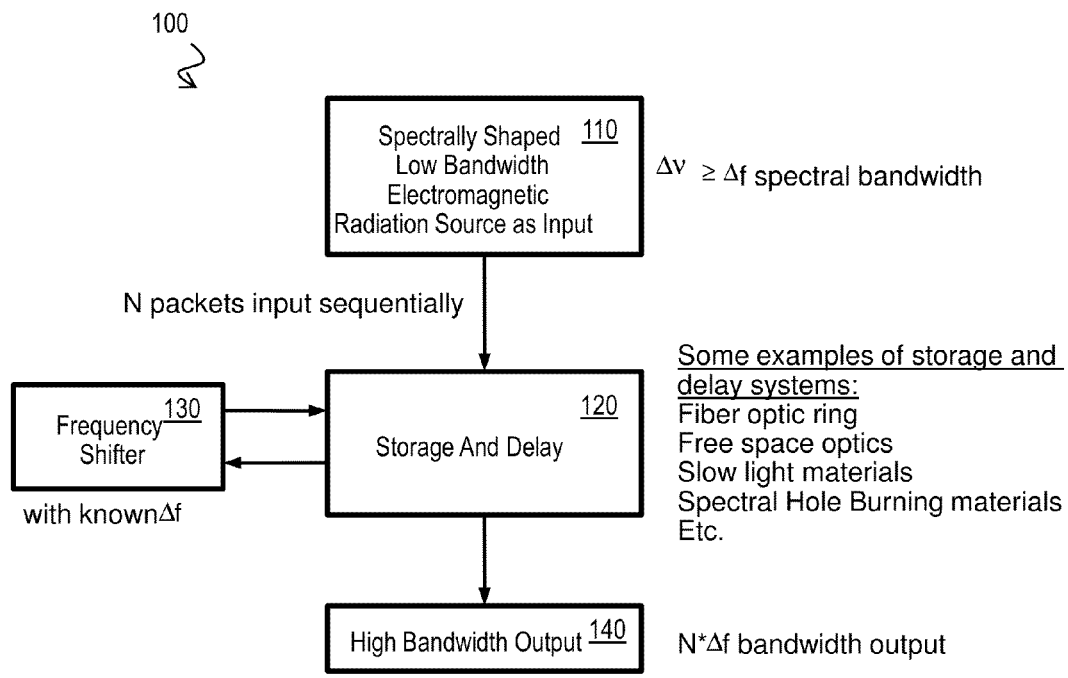
FIG. 1 is a high level block diagram of example components of an OAWG, according to one embodiment.

A method and apparatus are described for broadband optical arbitrary waveform generation (OAWG). In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Some embodiments of the invention are described below in the context of arbitrary broadband optical waveforms. However, the invention is not limited to this context. In other embodiments arbitrary waveforms of other portions of the electromagnetic spectrum, such as microwave waveforms, are generated using steps and components known to correspond to those described below for optical waveforms.

Some basic attributes of the desired waveform are wide bandwidth (BW) and its time aperture (TA). The metric of the time bandwidth product, or TBP=TA×BW covers both of these attributes. OAWG techniques can also be used to create radio frequency (RF) or millimeter wave (MMW) waveforms, a concept called herein RF-AWG. The approach is similar to OAWG but in which the output signal is a voltage, typically created by interacting the produced optical waveform with a photodetector, which converts photons to voltages.

1. Overview

According to example embodiments described herein, wideband spectral shaping of optical signals with complete phase and amplitude control provide capabilities for generating complex waveforms that are difficult, expensive, or impossible to generate or transmit by purely electronic means [refs 1,2]. In various embodiments, the output is either an optical signal, or RF/MMW signals. Generation of agile, complex, wideband waveforms is useful for sophisticated military applications including electronic countermeasures, optical code-division-multiple-access (CDMA) systems, synthetic aperture RADAR (SAR), low probability of intercept (LPI) RADAR, unambiguous Range-Doppler radar or laser radar, optical free space communications, and pulse shaping for spectroscopy, among others [refs 3, 4, 5, 6].

To meet these demanding performance targets, embodiments of enhanced OAWG systems are described herein, including an experimental prototype device embodiment. The approach is based on the coherent accumulation and interference of spectrally shaped waveforms. This represents a fundamental new direction in OAWG methodology—as this photonic approach is fundamentally different from other techniques that are known for the synthesis of wideband RF waveforms with photonic means [refs. 7, 8]. A difference of the approach presented herein from other approaches is in doing coherent waveform synthesis, in which the technique builds on a frequency and phase stable continuous wave (cw) laser and uses control signals derived from conventional, narrowband and stable components (both modulators and electronics). The photonic components include a coherent photonic ring apparatus with several control points. This is opposed to the prior art approach of modulating a train of brief optical pulses. The benefits in the new OAWG approach presented here include one or more of: full wideband operation of 10 gigahertz (GHz, 1 GHz=$10^9$ Hertz, 1 Hertz=1 cycle per second) or higher; and a significantly increased time aperture of 100 to 1000 times that of the prior art. For example, the time aperture scales to several microseconds ($\mu s$, 1 $\mu s=10^{-6}$ seconds) or longer for one or more of the illustrated embodiments, as compared to a limit of several nanoseconds (ns, 1 ns=10-12 seconds) when using brief pulses.

The illustrated embodiments build on the concept of a spectrally accumulated signal in a optical storage ring. Some embodiments have focused on methods for generating accurate, broadband, rapid frequency chirps that span ranges approaching 1 terahertz (THz, 1 THz=$10^{12}$ Hertz). With further development, this same innovative technology is extended in other embodiments to generate arbitrary optical waveforms with complete amplitude and phase control over bandwidths of 1 GHz-1 THz, and with time apertures of 1-100 $\mu s$, and spectral resolution down to ~10 kilohertz (kHz, 1 kHz=$10^3$ Hertz). These are example ranges, and not intended to be limiting on either end of the scale.

An advantage of some embodiments includes operating with modern but rather ordinary photonic components. These components consist of lasers, fiber optics, low bandwidth modulators, low bandwidth control electronics, fiber optical amplifiers, and related fiber optical items (splitters, couplers, etc). This is an advantage in that the laser light can be formed arbitrarily wherever there are available components. Typically this means there is a good fit to the technologically significant 1.5 micrometer ($\mu m$, 1 $\mu m=10^{-6}$ meters) wavelength telecom band, allowing the OAWG device to be constructed from high-quality commercial off-the-shelf components (COTS)—an important advantage for practical commercialization and mass-production of OAWG units.

2. Structural Overview

FIG. 1 is a high level block diagram of example components of an OAWG 100, according to one embodiment. Although processes, equipment, and data structures are depicted in FIG. 1 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts. As shown in FIG. 1, the AOWG 100 includes spectrally shaped, low bandwidth, electromagnetic radiation source 110, storage and delay device 120 to accumulate spectral input packets, a frequency shifter 130 that produces a known spectral frequency shift on all components of the stored radiation, and a high-bandwidth output coupler 140 to pass accumulated spectrum at either optical or microwave frequencies.

3. Operational Overview

The OAWG 100 is configured for one or more of the following operations. 1. Input source may be electromagnetic radiation source. 2. Input source packets perform only lower bandwidth shaping as compared to desired output bandwidth of a target broadband waveform. 3. Input source provides N limited bandwidth packets, each individually spectrally configurable with lower bandwidth controls. 4. Each one of N input packets is input sequentially into storage device. 5. Storage device has intrinsic delay time that can store previous packets with a time aperture up to that delay duration. 6. Storage is paired with frequency shifter that shifts previously input spectral packets to other frequencies to open up spectral window for new inputs. 7. New input spectrum packets are inserted into the next sequential spectral window. 8. After N sequential cycles of input, the storage device has accumulated and now contains up to N times the bandwidth of the original low bandwidth inputs. 9. After all inputs have been accumulated, storage device outputs waveform through an output coupler. 10. Output is capable of producing higher bandwidth modulation than was directly controlled by input sources. 11. Output has an N-times spectral enhancement factor above the input bandwidth that was implemented by input time division multiplexing and spectral accumulation. 12. Device may accumulate broadband incoherent spectra with uncorrelated inputs. 13. Device may accumulate broadband coherent spectra with phase correlated inputs, phase stable storage during delay time, and precise synchronization of inputs with previously stored spectral content. 14. Storage device contains methods to regenerate signal losses such as re-amplification or digital quantization.

Figure 2:
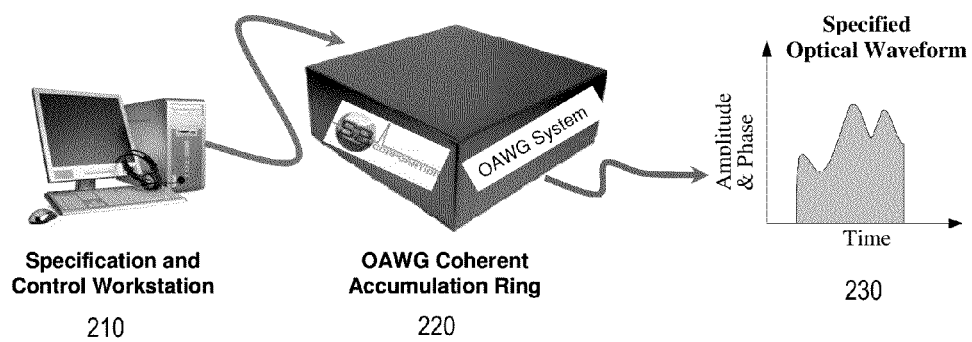
FIG. 2 is a block diagram of an OAWG System in which a control computer interfaces with photonic hardware to create user specified optical arbitrary waveforms, according to an embodiment.

FIG. 2 is a block diagram of an OAWG System in which a control computer 210 interfaces with photonic hardware 220 to create user specified optical arbitrary waveforms 230, according to an embodiment. In this practical high level industrial system embodiment, a master computer control workstation electrically controls a photonics hardware package, with the result being an optical arbitrary waveform emitted from the hardware with a tailored time domain response.

4. Example Embodiments

A preferred embodiment for OAWG 100 provides complete and arbitrary control of optical amplitude and phase over the full output bandwidth in order to generate the target broadband waveform. This embodiment employs coherent light and a regenerating optical ring that is designed to act as an optical time-to-frequency converter.

Figure 3:
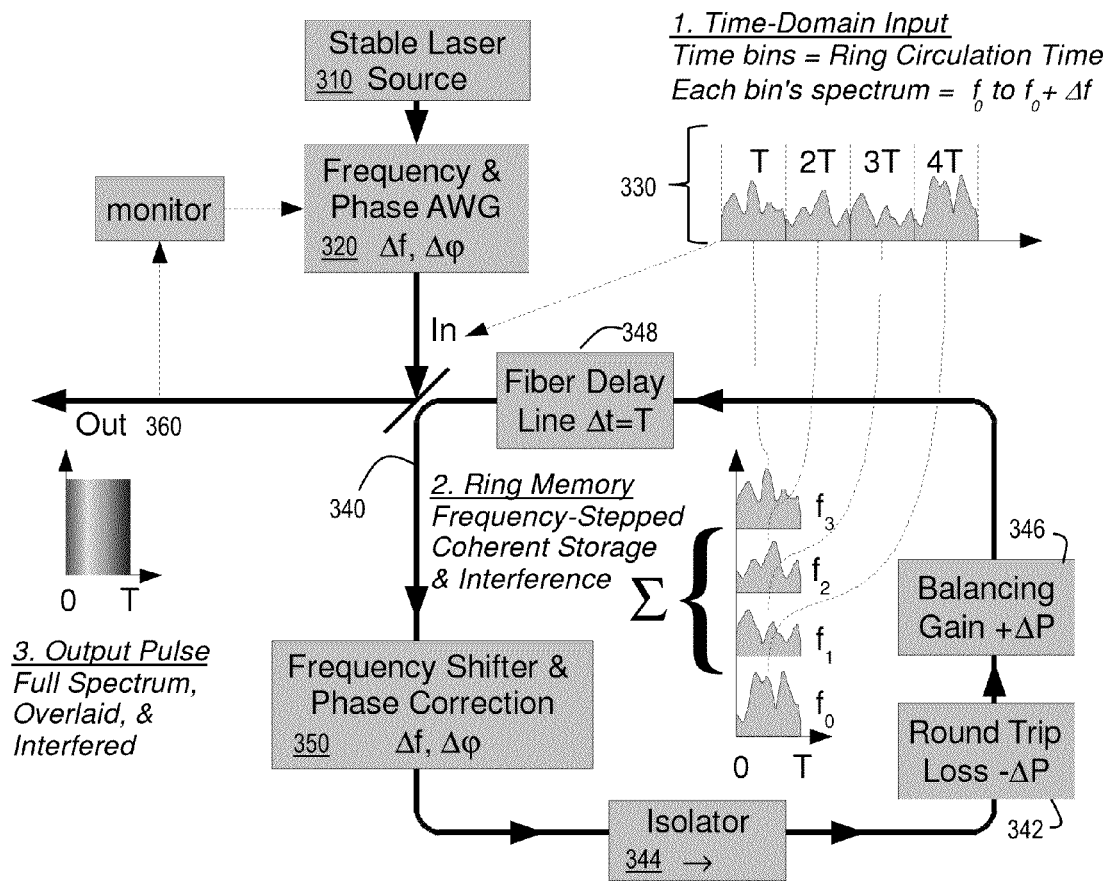
FIG. 3 is a block diagram that illustrates an example basic regenerating optical ring for OAWG, according to an embodiment.

FIG. 3 is a block diagram that illustrates an example basic regenerating optical ring for OAWG, according to an embodiment. In this embodiment, light from a frequency stable continuous wave laser source 310 is spectrally shaped by well-established methods using RF-driven optical modulators 320 to generate individual low-bandwidth, long time aperture waveforms 330. These individual high-resolution waveforms are then sequentially injected into a regenerating optical ring 340 where they are frequency shifted by an intra-ring acoustic optical modulator (AOM) 350 during each ring circulation. Thus, a time-dependent input pulse is injected into the optical storage ring where it is frequency shifted on each circulation. Coherent interference between sequentially injected input waveforms and the coherent light stored in the ring generates wideband optical waveforms at the ring output 360. Other components in the ring compensate for loss 342 and reflections. For example isolator 344 ensures one propagation direction, balancing and gain components 346 compensate for loss 342 and fiber delay line 348 adds to the time aperture.

As additional waveforms are sequentially injected into the optical ring, each waveform coherently interferes with all the accumulated waveforms previously stored in the ring. Because of the continuous optical frequency stepping incorporated into the ring design, subsequent injected waveforms each span an independent section of the optical spectrum, and the coherent interference of these stored waveforms generates the high-bandwidth optical arbitrary waveform output. After the desired spectral range is accumulated in the ring, the optical waveform is coupled out of the ring and generation of the next waveform may begin, or the current waveform may be continuously repeated if desired. A modular fiber delay line 348 inside the optical ring controls the ultimate waveform time aperture, and an intra-ring optical amplifier 346 compensates all losses incurred during circulation. In the illustrated embodiment, phase control can be enforced through control of the RF phase driving the intra-ring frequency shifter 350; however, it is anticipated that in other embodiments an intra-ring EOM could be included for precise dynamic control of the phase.

The fact that this simple and well-controlled method for constructing wide-bandwidth optical waveforms only requires low-bandwidth spectral shaping techniques acts as a tremendous advantage in design, construction, flexibility, and cost.

Figure 4:
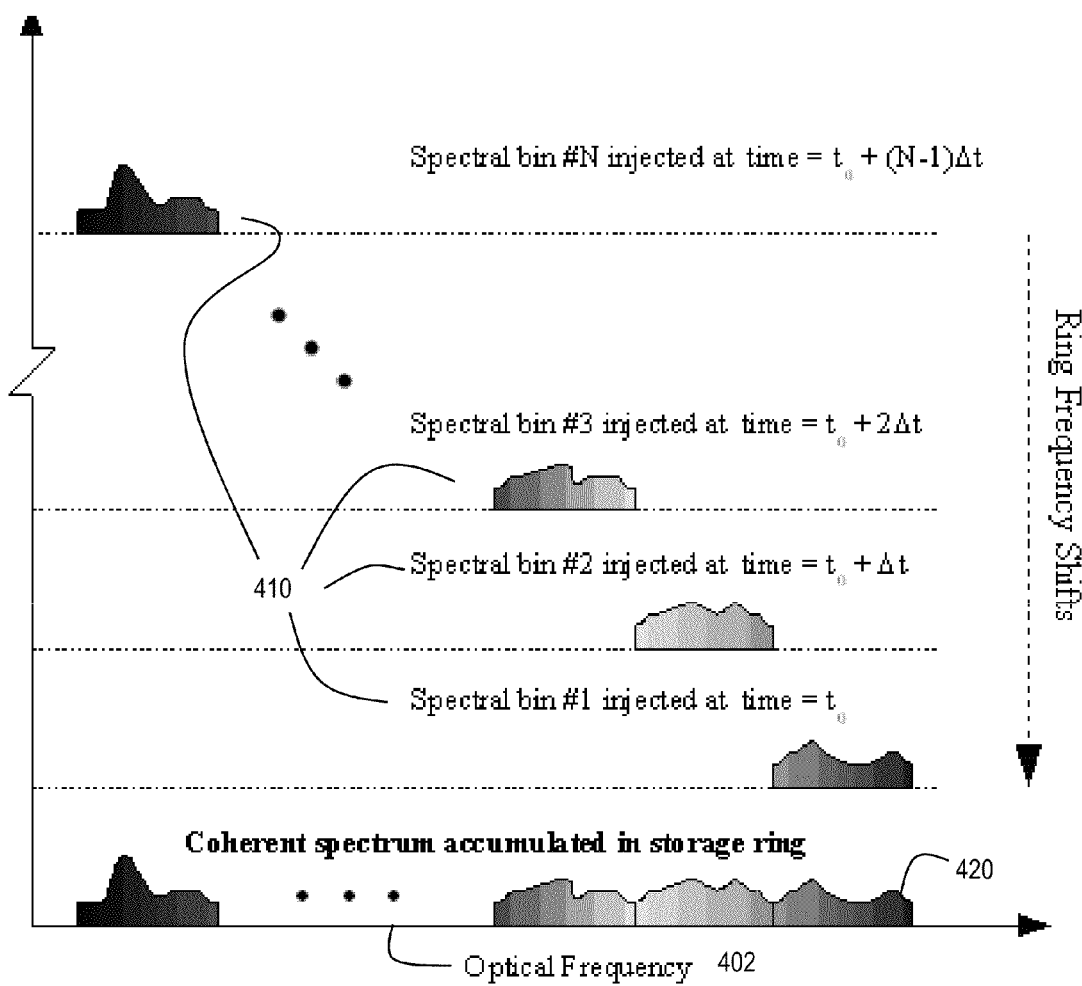
FIG. 4 is a block diagram that illustrates example spectral synthesis by accumulation of sequentially injected and frequency shifted pulses, according to an embodiment.

FIG. 4 is a block diagram that illustrates example spectral synthesis 420 on an optical frequency axis 402 by accumulation of sequentially injected and frequency shifted pulses 410, according to an embodiment.

Figure 5:
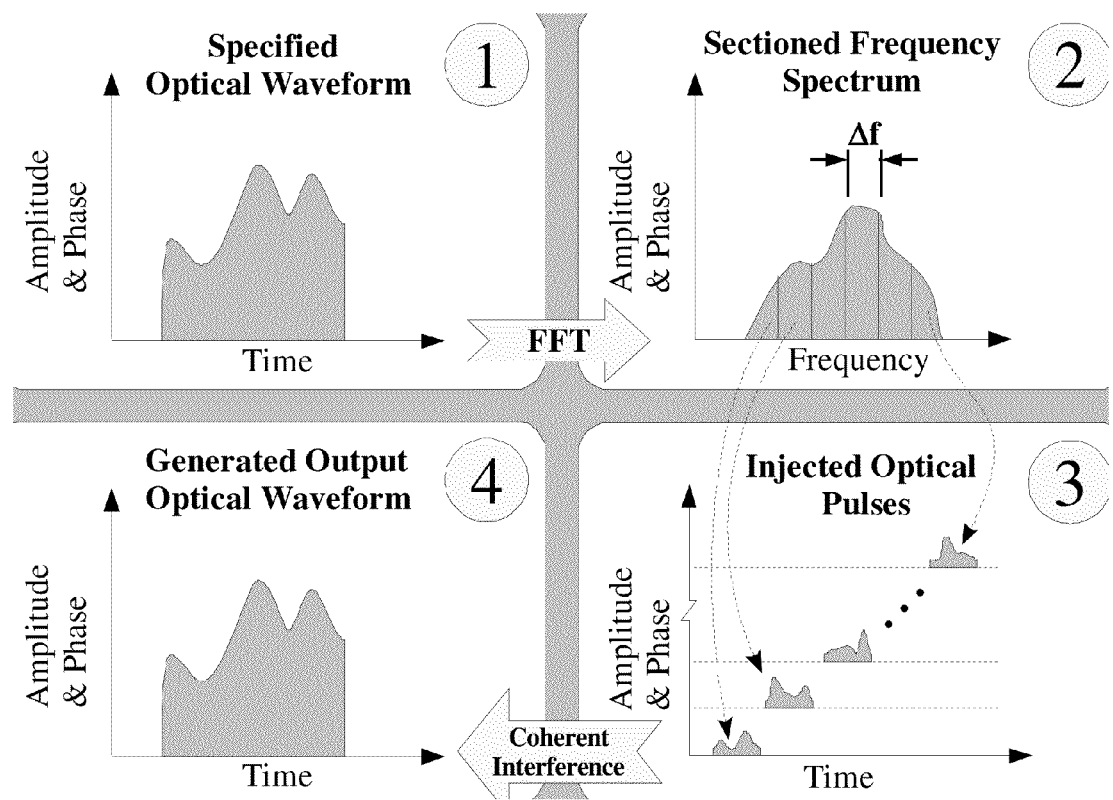
FIG. 5 is a block diagram of sequential steps involved in using coherent accumulation of many low-bandwidth frequency shifted pulses to generate a single high-bandwidth arbitrary optical waveform, according to an embodiment.

FIG. 5 is a block diagram of sequential steps involved in using coherent accumulation of many low-bandwidth frequency shifted pulses to generate a single high-bandwidth arbitrary optical waveform, according to an embodiment. Although steps are depicted in FIG. 5 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

In the illustrated embodiment, Steps 1 and 2 are done a priori on an electronic computer or ship (as described below with reference to FIG. 11 and FIG. 12, respectively); while steps 3 and 4 are done in photonic hardware (e.g., as depicted in FIG. 3). The basic operational approach for constructing an arbitrary optical waveform with this accumulation method is diagrammed in FIG. 5. With Step 1, the desired target broadband optical waveform phase and amplitude profile are entered into a software interface. In Step 2, the software calculates the Fourier spectrum of the desired waveform and sections the spectrum into individual frequency bins with width on the same order as the ring stepping frequency. During Step 3, these individual sections of the spectrum are inverse Fourier transformed to generate low-bandwidth temporal waveforms that are then sequentially shaped and injected into the optical ring where they are frequency shifted on each circulation to cover the entire desired frequency bandwidth after a specified number of circulations. This leads to Step 4, where the coherent interference of all the frequency-shifted low-bandwidth injected waveforms reconstructs the desired high-bandwidth optical waveform that is then coupled out of the ring on demand.

As evident in the above figures, these embodiments introduce a fundamental new direction in OAWG methodology: replacing the typical space-to-frequency conversion employed in optical comb techniques for OAWG with a new approach of coherent accumulation. This new concept provides unique advantages through the existing technological capability for controlling time more precisely than spatial channel separation.

There are several reasons why broadband optical arbitrary waveform generation in a re-circulating optical ring can achieve more precise waveform synthesis than what is possible with spectral line-by-line filtering of the comb emission spectrum of a mode-locked laser. A self-referenced optical frequency comb [ref. 9] can emit a set of very broadband frequency components that can be individually manipulated for waveform synthesis. These systems generally employ dispersive elements to spatially separate the spectral components onto a spatial light modulator (SLM) that allows the phase and amplitude of each spectral component to be manipulated. In the current state-of-the-art OAWG systems, individual phase-locked spectral lines of the optical frequency comb are imaged onto independent pixels of the SLM to allow for spectral resolutions limited only by the mode-locking frequency [refs 10, 11, 12]. While these system provide excellent capabilities for generating waveforms with bandwidths of THz or more, there are significant limitations in present day filtering technologies for how precisely the desired spectrum can be shaped after spatial separation by a diffraction grating.

Recent SLM demonstrations [ref. 13] for arbitrary waveform shaping have used on the order of $10^2$ elements (perhaps extensible to about $10^3$) to control the entire bandwidth of the comb using available sizes of transmissive LCD pixel arrays. This restrictive limitation on the number of independent spectral data bits directly translates to limited dynamic range and waveform shaping capabilities. Furthermore, current SLM technology based on thermo-optic effects or LCD arrays is limited to slow refresh rates of typically a few kHz. In addition, practical frequency mode spacings are limited to MHz to GHz ranges, limiting the non-repetitive waveform time apertures to less than microseconds, and more typically to nanoseconds. While a variety of techniques may be employed to spread the discreet spectral elements continuously over the spectrum, the spacing of SLM pixels still sets the ultimate frequency resolution.

Various illustrated embodiments for OAWG through coherent accumulation provide many unique advantages over traditional methods of spectral shaping of frequency combs. These advantages arise through the approach of using a highly stable cw laser source with a frequency stepping optical storage ring as an effective time-to-frequency converter, allowing all of the spectral shaping to be performed in the time domain. With this technique, time can be mapped to frequency with any chosen proportionality so that individual sections of the final frequency spectrum may be shaped with a spectral resolution and bandwidth chosen to match available low-cost COTS RF frequency opto-electronic components. Furthermore, the ultimate non-repetitive length of the time aperture is only limited by the optical fiber delay line in the ring, which can easily be greater than 100 µs. As a result, complete and continuous spectral shaping across a bandwidth of up to 1 THz is possible with resolutions of 10 kHz, corresponding to phase and amplitude control of $10^8$ independent spectral channels—a capability clearly far advanced of the 100-1000 channels available with SLM technology. This high spectral resolution is preferred for optical synthesis of wideband RF waveforms or generation of complex and agile optical waveforms for LADAR.

FIG. 6 is a table that illustrates example specifications for existing state-of-the-art laboratory demonstrations (see for example [ref. 7]) compared to example practical specifications for a new solution, according to an embodiment achievable with current components.

Figure 7:
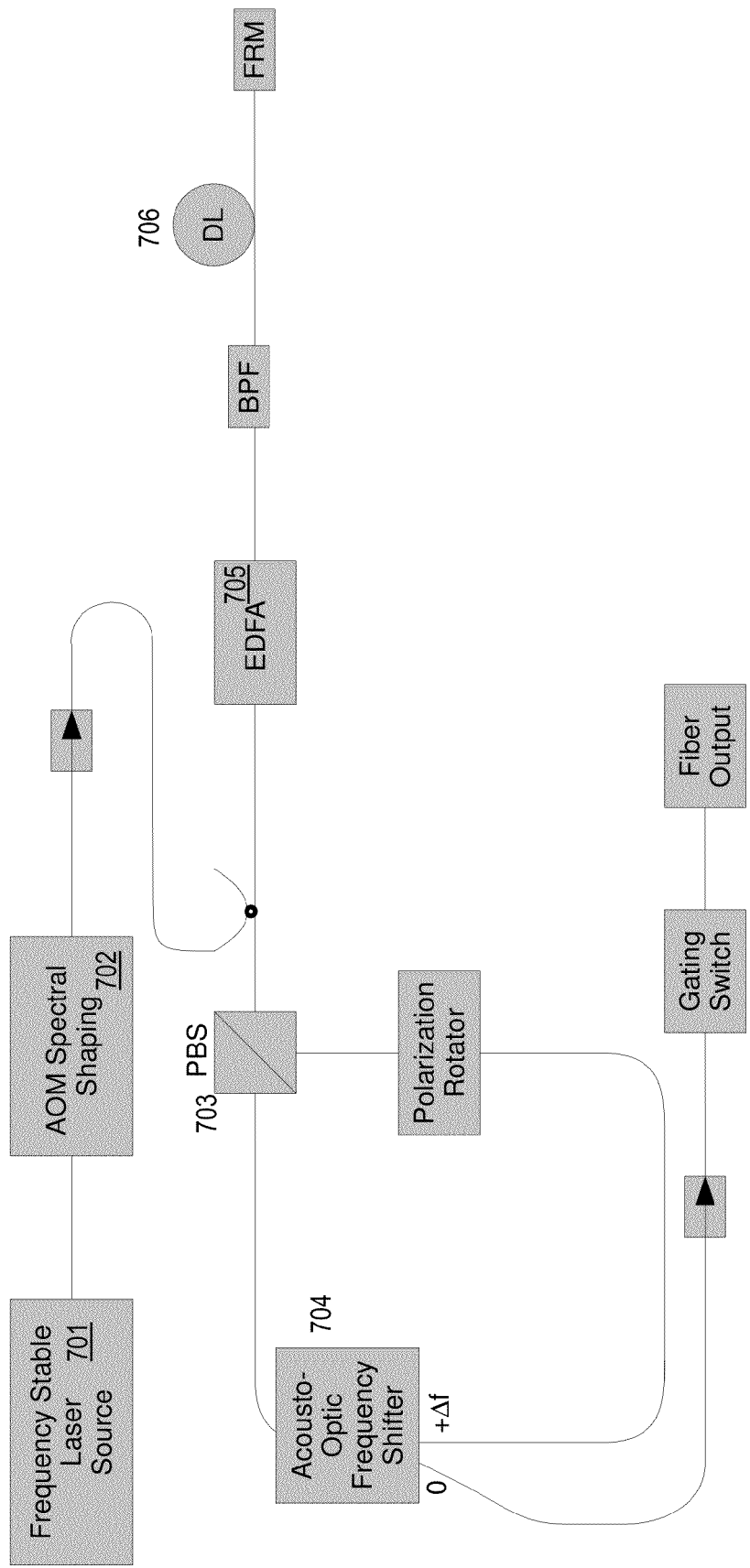
FIG. 7 is a high level block diagram that illustrates another implementation with additional advantages, according to an embodiment.

While there are many different embodiments anticipated, a preferred embodiment for generating high bandwidth phase and amplitude controlled output waveforms is depicted in FIG. 7. FIG. 7 is a high level block diagram that illustrates another implementation with additional advantages, according to an embodiment. The embodiment of FIG. 7 involves one or more of the following: frequency stable, narrow linewidth, laser source 701, for example an optical fiber laser source; high dynamic range amplitude and phase/frequency modulation 702 for input shaping, for example a waveguide AM and PM modulators or acousto-optic modulators; optical coupler to inject input waveforms into storage ring, for example a fiber optic beam splitter 703; optical frequency shifter in storage ring 704, for example an acousto-optic frequency shifter; linear optical amplifier, for example erbium doped fiber amplifier (EDFA) 705; optical delay line 706, for example a length of single-mode optical fiber combined; precise system timing such as injection pulses, stable master clock 707 for all electronic signals; and constant relative phase lock of input laser optical frequency, optical frequency shifter, and optical storage ring circulation frequency (inverse of round trip circulation time period).

5. Experimental Results

The high-level design of the preferred implementation as depicted in FIG. 7 was implemented and used to produce experimental results. Commercial off the shelf (COTS) optical components at 1.5 micron optical wavelengths were used. Results of this proof of principle demonstrations are shown below in FIG. 8, FIG. 9 and FIG. 10. These results are very promising and demonstrate that this approach is practical with existing COTS components.

5.1 RFAWG at 3.2 GHz Bandwidths, 420 Ns Time Aperture, and TBP=1146

Some embodiments involve a RF output waveform rather than an optical output waveform, called herein "photonics-enabled Radio-Frequency Arbitrary Waveform Generation" (RF-AWG) and development efforts for such embodiments are summarized below This demonstration's goal was to show embodiments capable of high-speed synthesis at the expected 3.24 GHz of bandwidth that were able to be measured using present equipment. The highest bandwidth waveforms to date were synthesized by embodiments using forty circulations, with injection waveforms at spectral intervals of 80.993 MHz, for a total bandwidth of 3.24 GHz. The created waveform fills approximately 350 ns of the full 419.79 ns wide time aperture, for a demonstrated Time Bandwidth Product (TBP) of 1,134.

Figure 8A:
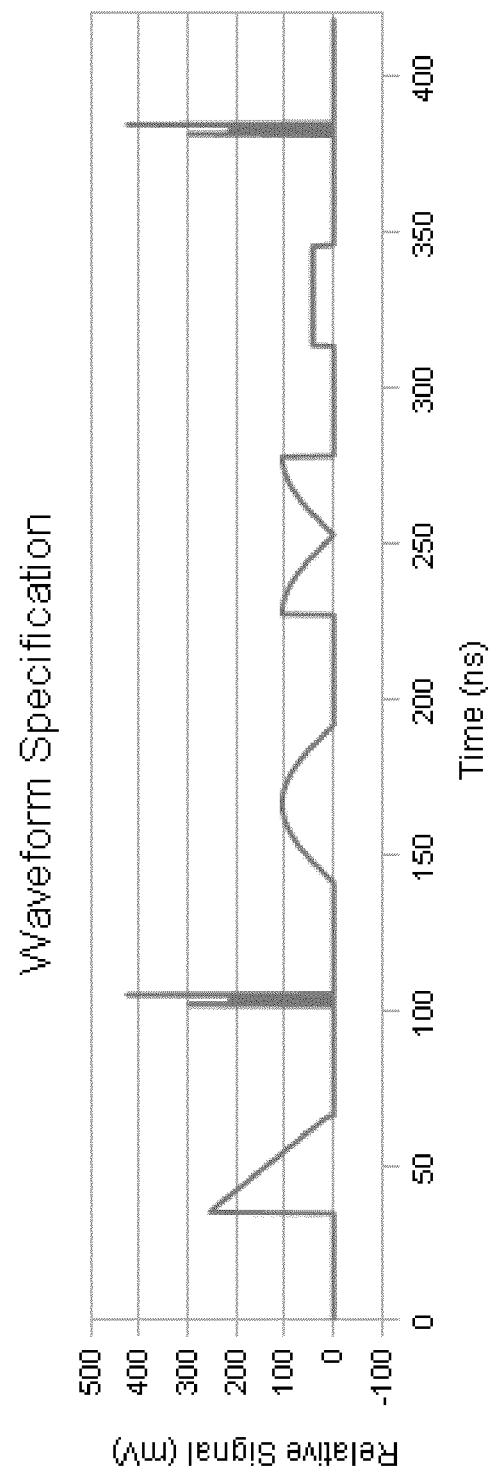
FIG. 8A, FIG. 8B and FIG. 8C are graphs that illustrate example synthesis of a 3.2 GHz waveform.
Figure 8B:
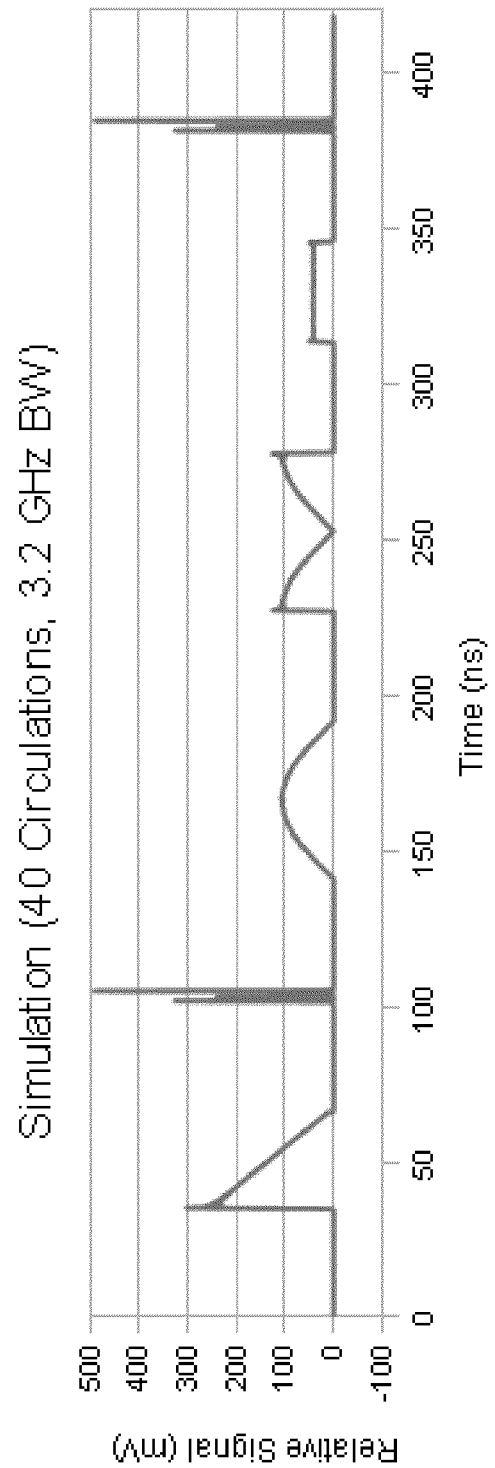
Figure 8C:
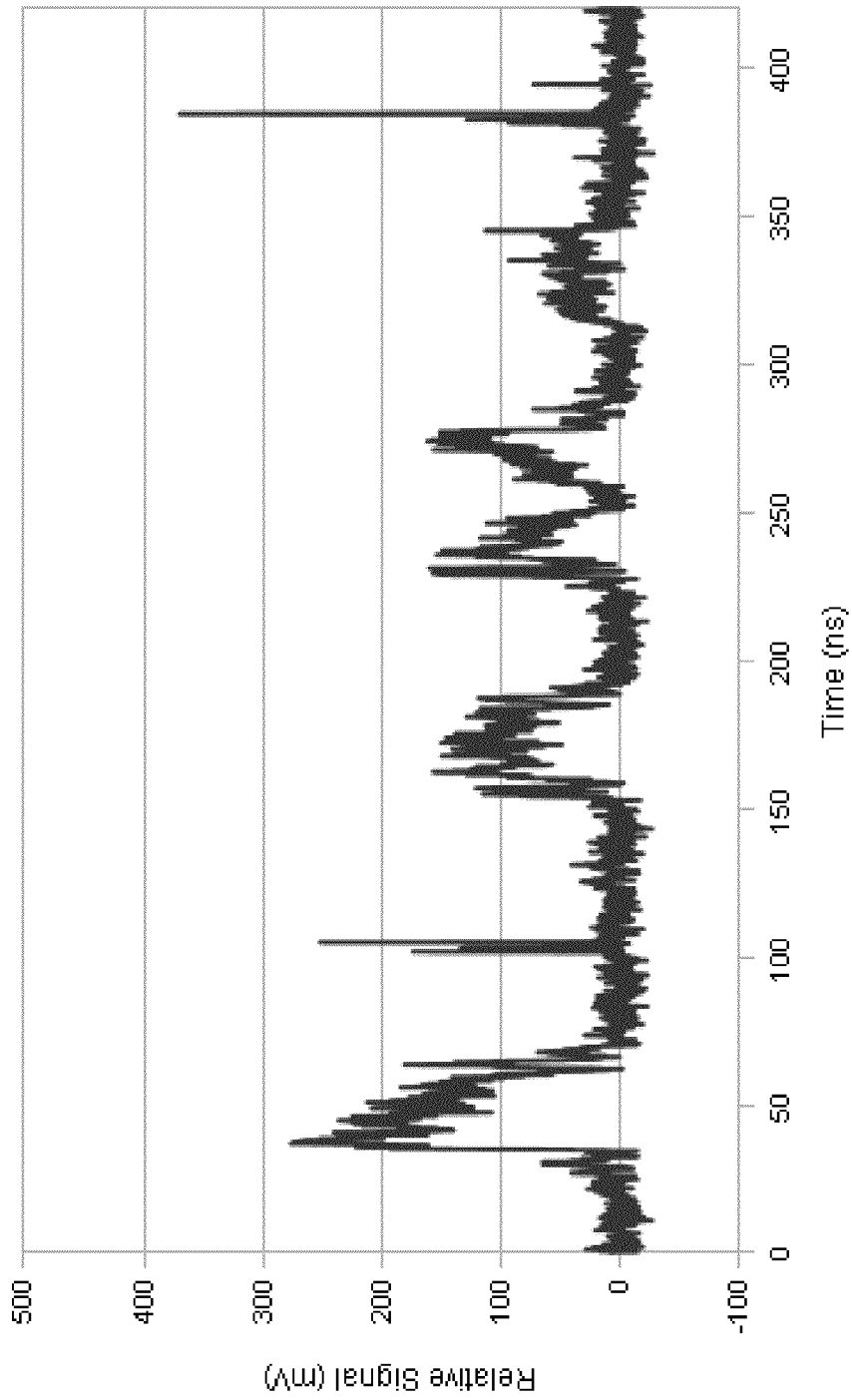

FIG. 8A, FIG. 8B and FIG. 8C are graphs that illustrate example synthesis of a 3.2 GHz waveform: FIG. 8A depicts an arbitrary waveform specification; FIG. 8B depicts a simulated output of forty accumulations with small, damped, transient oscillations after large changes; FIG. 8C depicts experimental data. The target broadband waveform specification is depicted in FIG. 8A. The features were selected to have both low and high bandwidth components. This shows that any mix of desired waveforms can be specified by programming them as a one dimensional array of amplitudes in the control computer's waveform partitioning software. The large, geometrical shapes are quicker and easier to visually interpret than irregular bit-streams, and they also provide for inspecting longer timescale signal continuity. Higher bandwidth features can be seen in two embedded repetitions of the previously demonstrated three bit pattern, as well as by studying the reproduction of the sharp vertical edges of the larger shapes.

FIG. 8B depicts the simulated interference computed by the computer program that also generates the forty low bandwidth injection waveforms. The assumptions of the simulation are that the phase and amplitude profiles of the injected waveforms are undistorted, the injection timing is perfect, and there is no noise in the system. At 3.24 GHz of bandwidth, the edges are quite sharp.

The entire experimental data trace for the full aperture is shown in FIG. 8C. The optical output of the storage ring was boosted by an EDFA amplifier, the amplified signal was detected by a photo-receiver with DC-12 GHz response, and recorded on a 3 GHz and 10 GS/s real-time oscilloscope (Tektronix TDS694C). No averaging or other filtering was used.

Figure 9A:
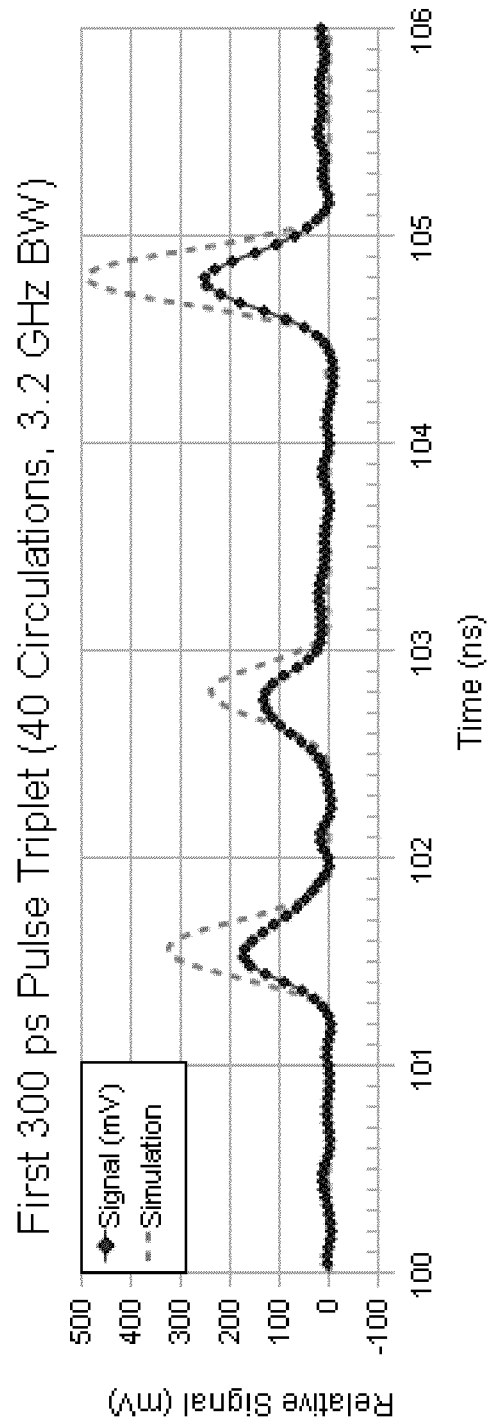
FIG. 9A, FIG. 9B, FIG. 9C and FIG. 9D are graphs that illustrate example pulses, according to various embodiments.
Figure 9B:
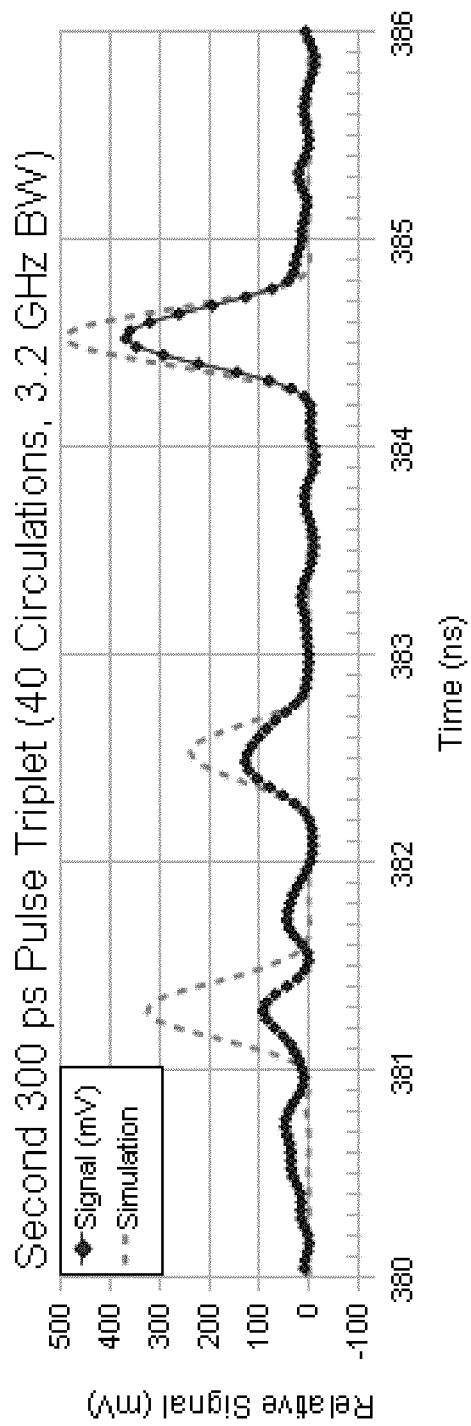
Figures 9C, 9D:
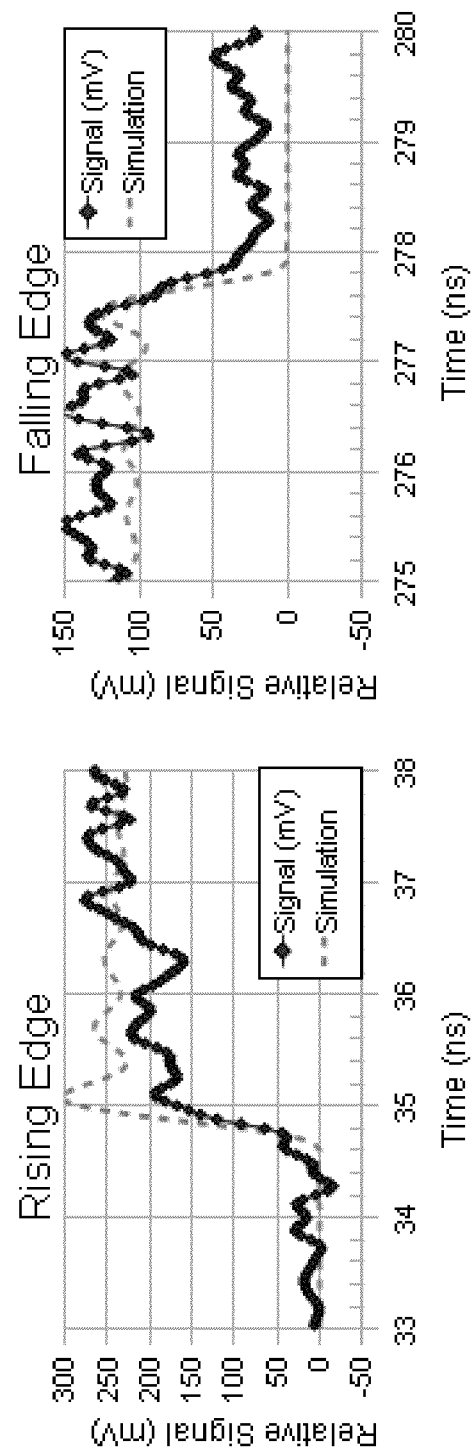

FIG. 9A, FIG. 9B, FIG. 9C and FIG. 9D are graphs that illustrate example pulses, according to various embodiments. FIG. 9A illustrates a detail of three brief data pulses with varied amplitude at 100 ns; FIG. 9B illustrates detail of second group of data pulses at 380 ns; FIG. 9C and FIG. 9D illustrate details of rising and falling edges at 35 ns and 278 ns, respectively. FIG. 9A shows the 300 ps wide pulses in more detail to illustrate that the synthesis is using the full 3.24 GHz net bandwidth of the forty injections. The peaks occur with the correct timing; however the amplitudes for the finer features are below that projected by the "perfect" simulation dashed curves. The simulation curves were scaled to best fit the larger shapes in the waveforms, which was effectively averaged by observing a longer duration for that waveform. Variations on the faster peaks could be due to phase noise on any of the circulations that might lessen the coherent interference of all the injections of the many spectral bands that is needed for full peak amplitude reconstruction. Similarly, the fast rising and falling edges have the wide spectral content of many circulations and are still noisy after the most rapid part of the peak edge.

In this embodiment, phase noise in the passive storage ring impairs the circulating reconstruction fidelity. This effect can be improved in other embodiments by actively stabilizing the optical storage ring. Improved waveform reliability is achieved in some embodiments after active stabilization hardware is added.

5.2 Embodiment for Bipolar RF Signal Generation & Demonstration

Some embodiments are designed for achieving bipolar radio frequency (RF) signal generation. Therein, the photodetector is a current source input to a high bandwidth Bias-T with DC throughput of a configurable fixed offset current added to the detected photocurrent, with the combined signal then sent through a resistive load. This allows the photocurrent to be operated at a nominal half-maximum level for zero signal that is offset above and below that level for positive and negative signals, respectively.

Figure 10A:
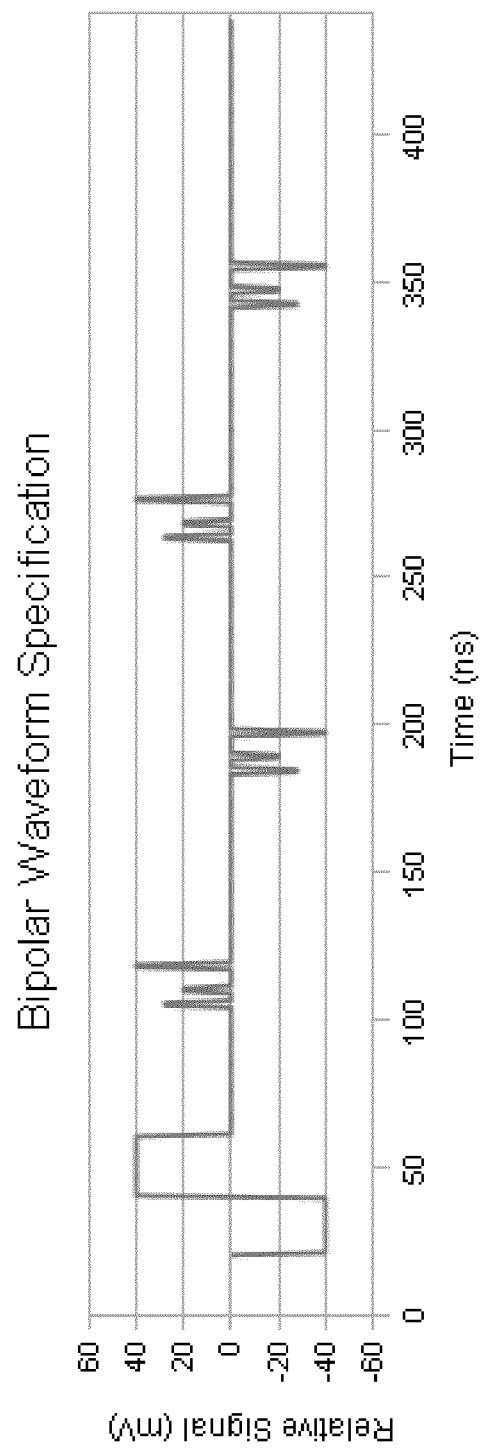
FIG. 10A, FIG. 10B and FIG. 10C are graphs that illustrate an initial demonstration of bipolar waveform synthesis for waveform specification (FIG. 10A) using a boosted optical level bias (unipolar optical power), and then a post-detection subtracted electronic offset via a biased-T junction.
Figure 10B:
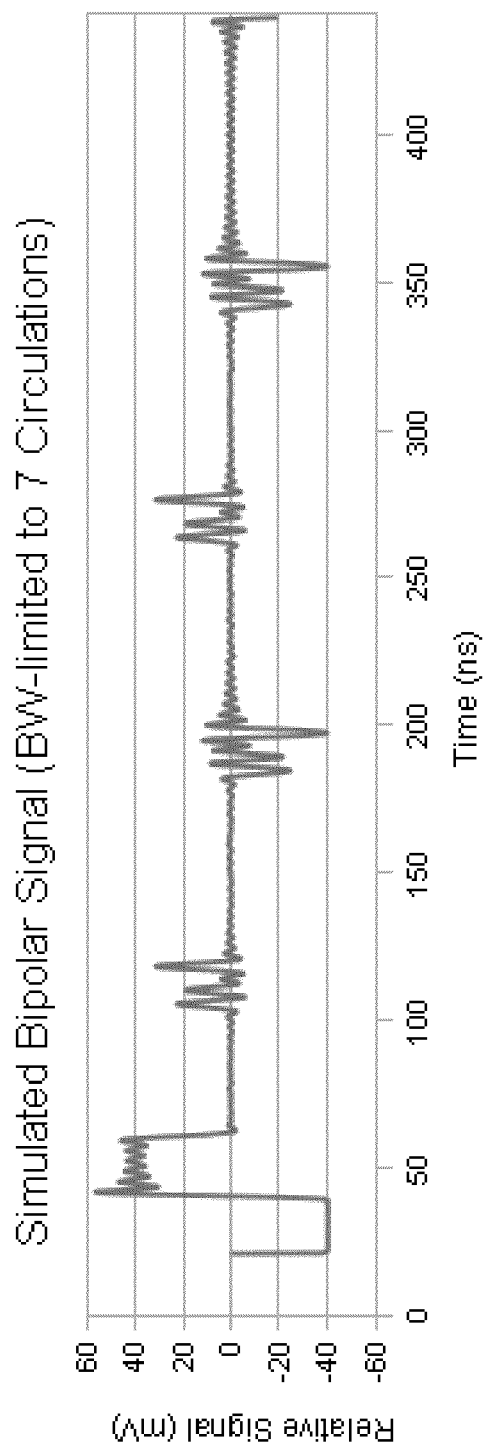
Figure 10C:
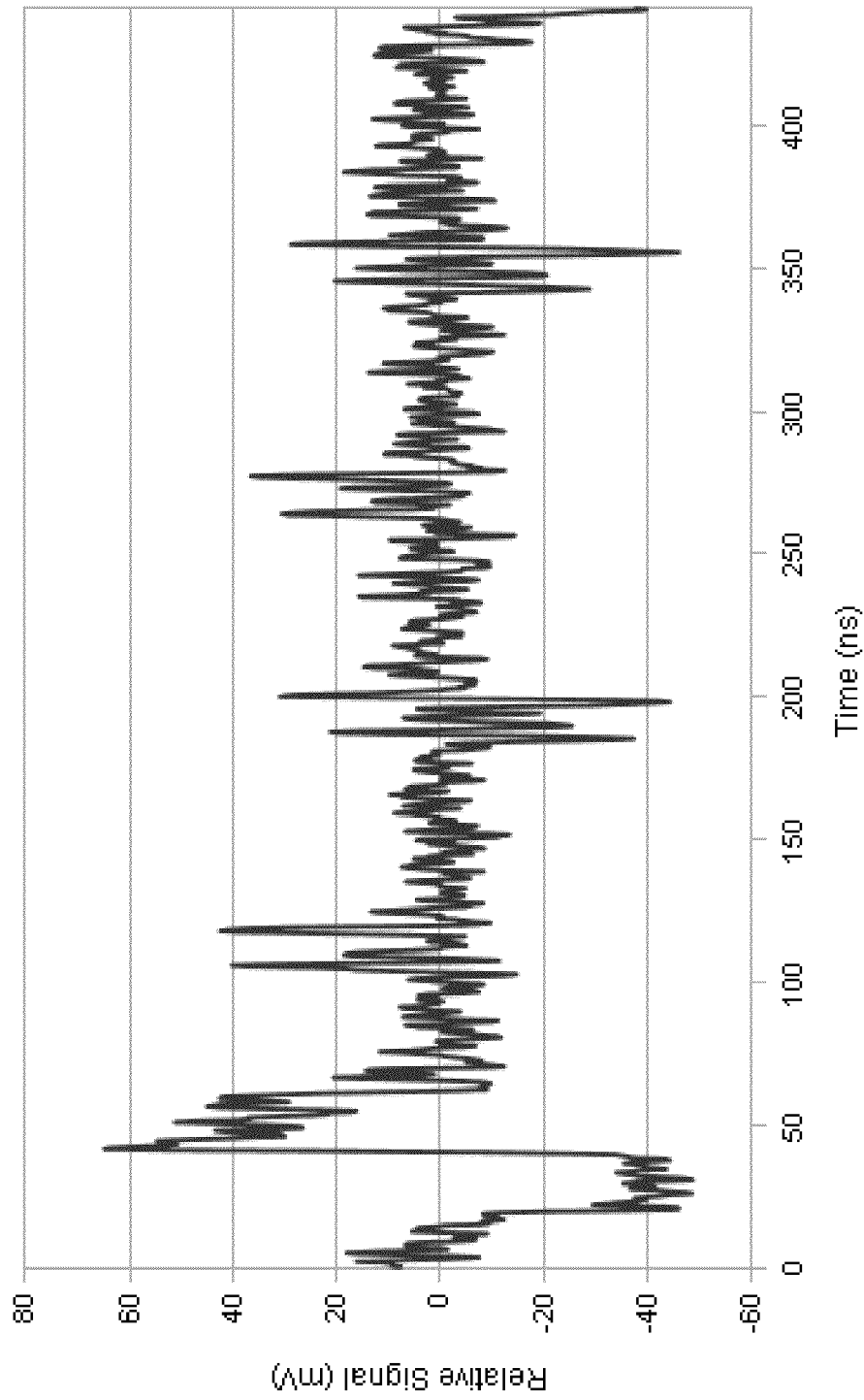

An initial demonstration was performed for synthesizing bipolar waveforms by using the previously suggested technique. FIG. 10A, FIG. 10B and FIG. 10C are graphs that illustrate an initial demonstration of bipolar waveform synthesis for waveform specification (FIG. 10A) using a boosted optical level bias (unipolar optical power), and then a post-detection subtracted electronic offset via a biased-T junction. With the limited bandwidth of only seven circulations, there are comparable transients observed in both simulation (FIG. 10B) and data (FIG. 10C).

An input waveform is specified as shown in FIG. 10A. This bipolar RF signal is temporarily converted to an equivalent unipolar signal by adding a half-maximum offset as a DC bias level, so that it is implemented as a simple unipolar power envelope for handling by the optical interference process steps in some embodiments. After the AC-coupled photodetector transfers the optical envelope to an RF signal, a Bias-T junction subtracts a fixed DC current to remove the preset optical bias level in these embodiments. The resulting current is passed through a resistive load (or alternatively through a transimpedance amplifier). The end output is a bipolar voltage waveform for the user.

The idea for creating "bipolar" optical waveforms biased at half optical intensity (for making bipolar RF signals via a post-photodetection subtracted offset) may be difficult to implement in some embodiments because much of the optical dynamic range is wasted with a large average "DC" component. More sophisticated strategies for dynamic range preservation are used in yet other embodiments, such as by employing compression with non-linear absorbers and non-linear re-amplification.

Preliminary data from initial embodiments is shown in FIG. 10C. In this embodiment, the optical waveform representation is broken down into seven injections comprising a total of 567 MHz of bandwidth for this data. The time aperture is 419.79 ns, and the resulting TBP was about 238. What is remarkable is that many of the transient oscillations that are most easily seen in the simulated trace of FIG. 10B are also quite visible as very similar mid-level oscillations in experimental data of FIG. 10C, indicating that these undulations are not just random noise.

6. Applications

The example optical arbitrary waveform generation devices (OAWG) serve applications grouped in two primary divisions: a) usage as a primary optical arbitrary waveform source, and b) usage for conversion of the optical waveform modulation to RF for the generation of 10 GHz-1 THz bandwidth signaling. One goal is for a portable, rugged photonic hardware system. Such OAWG embodiments are deployable for a variety of applications, in typical test and measurement packaging. Thus, applications can be divided into photonic outputs and RF outputs.

As one example of optical source market demand, the OAWG product provides an enabling component for the ultra-wideband signal processing capabilities of an optical LADAR/communications system. Our other capabilities can process UWB optical waveforms, and thus the OAWG embodiments are enabling for generating optical arbitrary waveforms, which are then optically processed.

Examples of applications using OAWG photonic outputs are: 1) a fundamental signal generator for photonic circuitry test and measurement to fill the unpopulated gap for 10 GHz-1 THz optical modulation sources; 2) optical analog to digital converter (ADC) systems, as described above; 3) LADAR with spectrally tuned and customized waveforms for maximum return for each situation; 4) LADAR vibrometry with extended range returns of the time aperture in the OAWG, where individualized analysis waveforms can be sequentially applied to each specific spectral return blip from a multiple vehicle return signal; 5) compressed optical communication streams using brevity and high bandwidth to compact the data for assisting in low probability of intercept communications; and 6) heterodyne detection using AWG for coherent detection, particularly with spectral compression for acquisition of sparse waveforms with spectral energy allocation directed to bandwidths of particular interest.

The application of OAWG as an input to the conversion interface for ultra-high speed RF applications is very similar but the end result is a voltage. The RF applications often involve development of a specialized RF backend, with a wideband photo-detector and amplifiers. This may be of particular interest for users or companies already possessing those capabilities. Applications include: 1) electronic countermeasures where incoming signals are jammed until a falsified signal is generated and returned to confuse the observer; 2) tailored spectrum waveforms to fill open space but avoid co-site interference; 3) collision avoidance range-Doppler waveforms; and 4) optically mixed pre- or post-compensation of high BW phase distortions from high-gain RF antennas with poor intrinsic phase response.

THz applications are also anticipated. Examples of these extensions are THz signal generation and THz signal processing. Also, broadband RF, MMW, THz and optical signals could be applied for medical potential in finding reactions and the impact on human cells to different electrical impulses using various frequencies, waveforms, and designs.

The need for an optical version of an AWG is as directly applicable to light wave circuitry as the analogs found in the ubiquitous counterparts for RF electronic circuits test bench equipment. Markets for existing electronic arbitrary waveform generators are large and expanding. According to Frost & Sullivan's market report, "World Signal Generators and Arbitrary Waveform Generators Markets" (released June 2008), there is a $667M global market in which RF signal generators account for 52.6 percent of the 2007 revenues. Estimates reach $888.5M in 2012, reflecting high growth rates in demand for AWGs with the increased development of higher performance instruments.

Commercial OAWGs do not exist, while electronic arbitrary waveform generators do, and have excellent performance with lower bandwidths, while still making excellent improvements over the past decade. As a point of comparison to what is currently available in the state-of-the-art high end AWG market place, Tektronix offers its AWG7102 product which offers approximately 4 GHz of bandwidth with ~6 ENOB for $120 k. OAWGs for RF applications are anticipated to meet the needs of users with very wide bandwidths >10 GHz, and for optical applications with 10-1,000 GHz of bandwidth. The end users may be expecting RF generator performance, but will likely relax expectations in exchange for higher bandwidth. Product pricing in this market is a highly competitive factor as the average price of the test instruments continue to steadily decline.

7. Computational Hardware Overview

Figure 11:
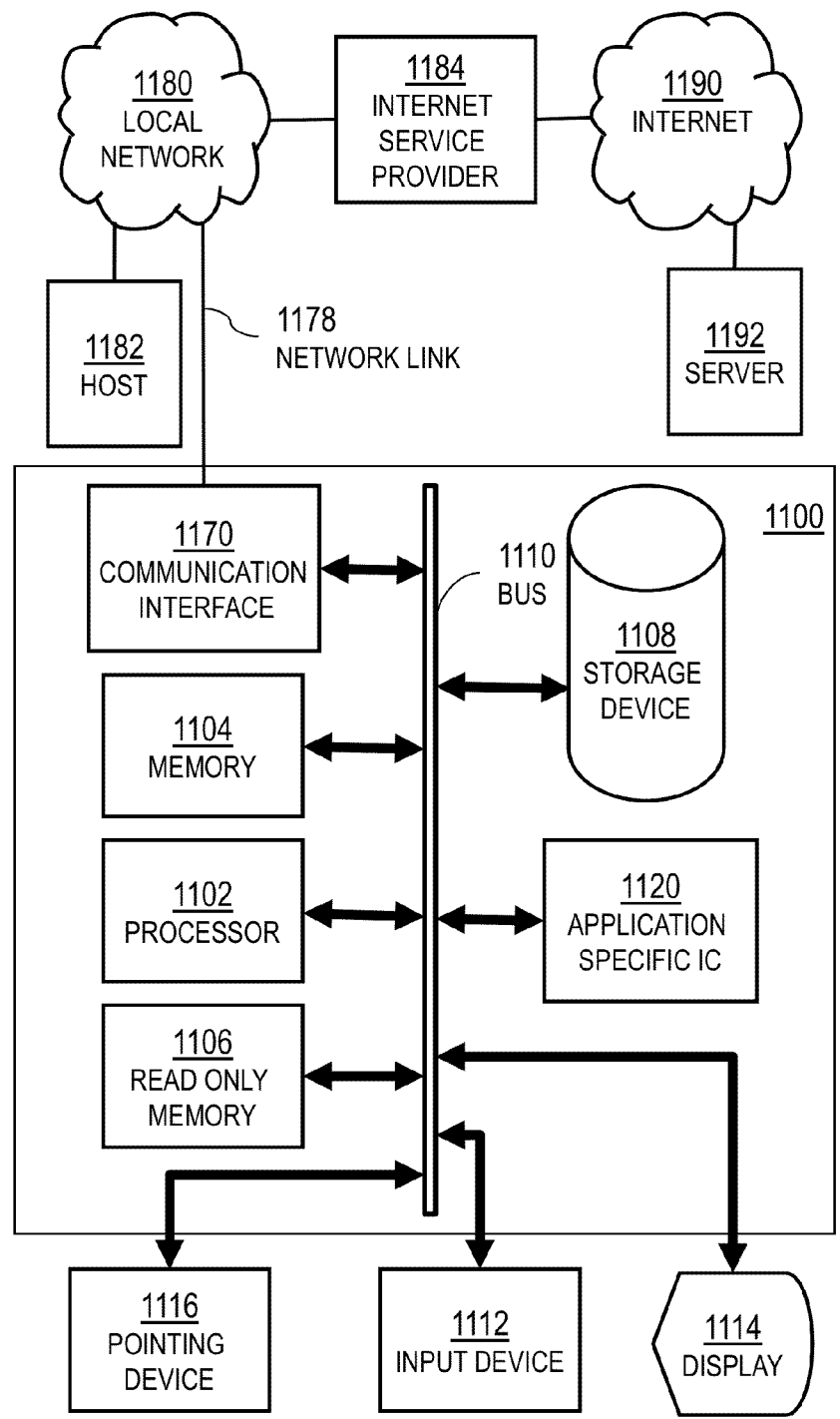
FIG. 11 is a block diagram that illustrates a computer system upon which an embodiment of the invention may be implemented.

FIG. 11 is a block diagram that illustrates a computer system 1100 upon which an embodiment of the invention may be implemented. Computer system 1100 includes a communication mechanism such as a bus 1110 for passing information between other internal and external components of the computer system 1100. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of one or more methods described herein.

A sequence of binary digits constitutes digital data that is used to represent a number or code for a character. A bus 1110 includes many parallel conductors of information so that information is transferred quickly among devices coupled to the bus 1110. One or more processors 1102 for processing information are coupled with the bus 1110. A processor 1102 performs a set of operations on information. The set of operations include bringing information in from the bus 1110 and placing information on the bus 1110. The set of operations also typically include comparing two or more units of information, shifting positions of units of information, and combining two or more units of information, such as by addition or multiplication. A sequence of operations to be executed by the processor 1102 constitute computer instructions.

Computer system 1100 also includes a memory 1104 coupled to bus 1110. The memory 1104, such as a random access memory (RAM) or other dynamic storage device, stores information including computer instructions. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of computer instructions. The computer system 1100 also includes a read only memory (ROM) 1106 or other static storage device coupled to the bus 1110 for storing static information, including instructions, that is not changed by the computer system 1100. Also coupled to bus 1110 is a non-volatile (persistent) storage device 1108, such as a magnetic disk or optical disk, for storing information, including instructions, that persists even when the computer system 1100 is turned off or otherwise loses power.

Information, including instructions, is provided to the bus 1110 for use by the processor from an external input device 1112, such as a keyboard containing alphanumeric keys operated by a human user, or a sensor. A sensor detects conditions in its vicinity and transforms those detections into signals compatible with the signals used to represent information in computer system 1100. Other external devices coupled to bus 1110, used primarily for interacting with humans, include a display device 1114, such as a cathode ray tube (CRT) or a liquid crystal display (LCD), for presenting images, and a pointing device 1116, such as a mouse or a trackball or cursor direction keys, for controlling a position of a small cursor image presented on the display 1114 and issuing commands associated with graphical elements presented on the display 1114.

In the illustrated embodiment, special purpose hardware, such as an application specific integrated circuit (IC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1170 sends and receives electrical, acoustic or electromagnetic signals, including infrared and optical signals, that carry information streams, such as digital data.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1102, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1102, except for carrier waves and other signals.

Logic encoded in one or more tangible media includes one or both of processor instructions on a computer-readable storage media and special purpose hardware, such as ASIC *~20.

Network link 1178 typically provides information communication through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190. A computer called a server 1192 connected to the Internet provides a service in response to information received over the Internet. For example, server 1192 provides information representing video data for presentation at display 1114.

The invention is related to the use of computer system 1100 for implementing the techniques described herein. According to one embodiment of the invention, those techniques are performed by computer system 1100 in response to processor 1102 executing one or more sequences of one or more instructions contained in memory 1104. Such instructions, also called software and program code, may be read into memory 1104 from another computer-readable medium such as storage device 1108. Execution of the sequences of instructions contained in memory 1104 causes processor 1102 to perform the method steps described herein. In alternative embodiments, hardware, such as application specific integrated circuit 1120, may be used in place of or in combination with software to implement the invention. Thus, embodiments of the invention are not limited to any specific combination of hardware and software.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server 1192 transmits program code for a particular application, requested by a message sent from computer 1100, through Internet 1190, ISP equipment 1184, local network 1180 and communications interface 1170. The received code may be executed by processor 1102 as it is received, or may be stored in storage device 1108 or other non-volatile storage for later execution, or both. In this manner, computer system 1100 may obtain application program code in the form of a signal on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red a carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

Figure 12:
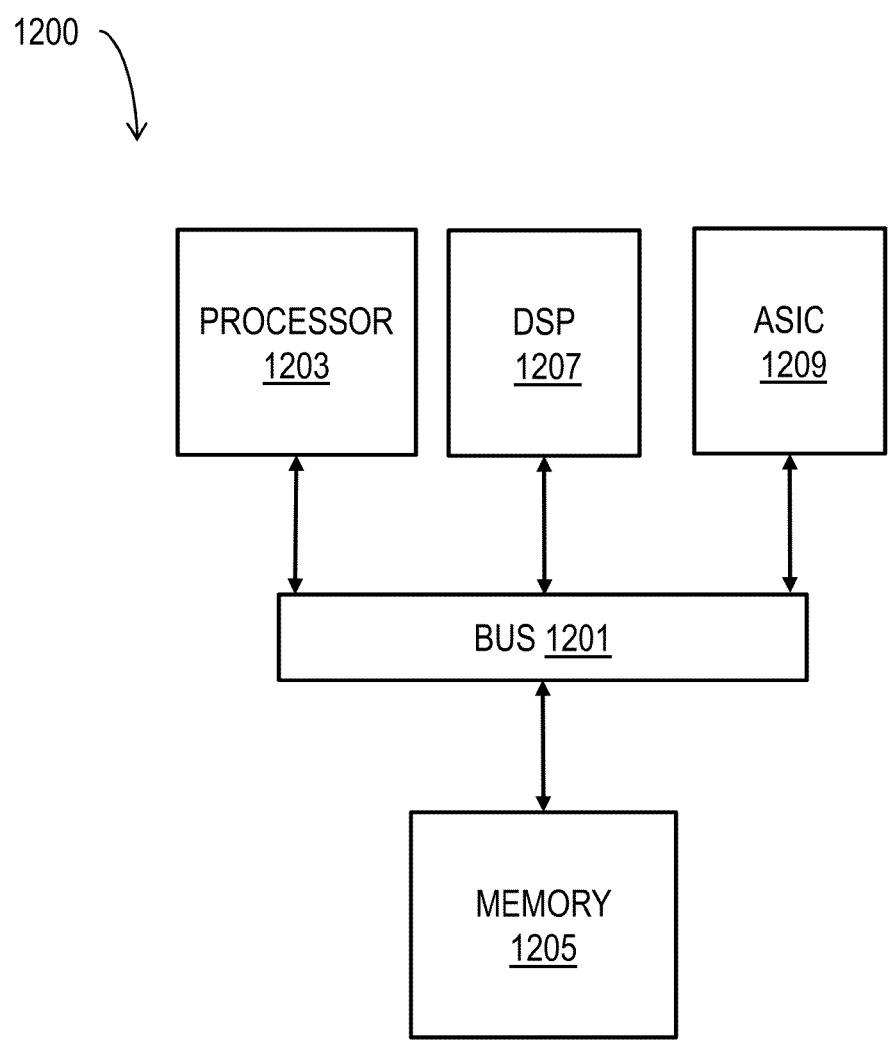
FIG. 12 illustrates a chip set upon which an embodiment of the invention may be implemented.

FIG. 12 illustrates a chip set 1200 upon which an embodiment of the invention may be implemented. Chip set 1200 is programmed to perform one or more steps of a method described herein and includes, for instance, the processor and memory components described with respect to FIG. *~incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of a method described herein.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1205 also stores the data associated with or generated by the execution of one or more steps of the methods described herein.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items. elements or steps. Furthermore, the indefinite article "a" or "an" is meant to indicate one or more of the item, element or step modified by the article.

REFERENCES

The following references are hereby incorporated by reference as if fully set forth herein except for terminology that is inconsistent with the terminology used herein.

[1] M. Hickey, R. Marsland, T. Day, "Generating Microwaves With Diode Lasers," Lasers & Optronics, p. 15, July 1994.

[2] J. O'Reilly and P. Lane, "Remote Delivery of Video Services Using mm-Waves and Optics," Journal of Lightwave Technology, v. 12, no. 2, p. 369, February 1994.

[3] Z. Jiang, D. E. Leaird, and A. M. Weiner, "Width and wavelength tunable optical RZ pulse generation and RZ-to-NRZ format conversion at 10 GHz using spectral line-by-line control," IEEE Photon. Technol. Lett., v. 17, no. 12, pp. 2733-2735, December 2005.

[4] Z. Jiang, D. S. Seo, S.-D. Yang, D. E. Leaird, R. V. Roussev, C. Langrock, M. M. Fejer, and A. M. Weiner, "Four user, 2.5 Gb/s, spectrally coded O-CDMA system demonstration using low power nonlinear processing," J. Lightwave Technol., v. 23, no. 1, pp. 143-158, January 2005.

[5] L. Mullen, A. Vierina, P. Herczfeld, and V. Contarino, "Application of RADAR Technology to Aerial LIDAR Systems for Enhancement of Shallow Underwater Target Detection," IEEE Transactions on Microwave Theory and Techniques, v. 43, no. 9, pp. 2370-77, September 1995.

[6] A. M. Weiner, "Femtosecond optical pulse shaping and processing," Progress in Quantum Electron., vol. 19, pp. 1-237, 1995.

[7] J. Chou, Y. Han, and B. Jalali, "Adaptive RF-Photonic Arbitrary Waveform Generator," IEEE Photonics Tech. Lett. v. 15, p. 581, April 2003.

[8] S. T. Cundiff and A. M. Weiner, "Optical arbitrary waveform generation," Nature Photonics, vol. 4, p. 766, November 2010, doi: 10.1038/nphoton.2010.196.

[9] S. A. Diddams et al., "Direct Link between Microwave and Optical Frequencies with a 300 THz Femtosecond Laser Comb," Phys. Rev. Lett. v. 84, p. 5102 (2000).

[10] D. Miyamoto, K. Mandai, T. Kurokawa, S. Takeda, T. Shioda, and H. Tsuda, IEEE Photon. Technol. Lett. v. 18, p. 721 (2006).

[11] N. K. Fontaine, R. P. Scott, J. Cao, A. Karalar, K. Okamoto, J. P. Heritage, B. H. Kolner, and S. J. B. Yoo, Opt. Lett. v. 32, p. 865 (2007).

[12] Z. Jiang, D. E. Leaird, C. B. Huang, H. Miao, M. Kourogi, K. Imai, and A. M. Weiner, IEEE J. Quantum Electron. v. 43, p. 1163 (2007).

[13] Z. Jiang, D. E. Laird, A. M. Weiner, "Optical Arbitrary Waveform Generation and Characterization Using Spectral Line-by-Line Control," J. Lightwave Tech. v. 24, p. 2487 (2006).

What is claimed is:

1. A method of producing an optical broadband waveform, comprising:
   generating a first narrowband optical waveform;
   generating a frequency-shifted replica by frequency shifting the first narrowband optical waveform by a frequency shift;
   generating a second narrowband optical waveform; and
   generating a broadband waveform by coherently combining the frequency-shifted replica and the second narrowband optical waveform.

2. A method as recited in claim 1, wherein generating the first narrowband optical waveform further comprises determining a spectrum and phase for the first narrowband optical waveform so that the broadband waveform substantively matches a target broadband waveform when the frequency-shifted replica is coherently combined with the second narrowband optical waveform.

3. A method as recited in claim 2, wherein generating the second narrowband optical waveform further comprises determining a spectrum and phase for the second narrowband optical waveform so that the broadband waveform substantively matches a target broadband waveform when the frequency-shifted replica is coherently combined with the second narrowband optical waveform.

4. A method as recited in claim 1, wherein the frequency shift is about as large as a bandwidth of the first narrowband optical waveform.

5. An apparatus comprising:
means for generating a first narrowband optical waveform;
means for generating a frequency-shifted replica by frequency shifting the first narrowband optical waveform by a frequency shift;
means for generating a second narrowband optical waveform; and
means for generating a broadband waveform by coherently combining the frequency-shifted replica and the second narrowband optical waveform.

6. A non-transitory computer-readable medium carrying one or more sequences of instructions, wherein execution of the one or more sequences of instructions by one or more processors causes an apparatus to:
determine a target broadband waveform;
determine a spectrum and phase for a first narrowband optical waveform; and
determine a spectrum and phase for a second narrowband optical waveform,
wherein a frequency-shifted replica of the first narrowband optical waveform coherently combined with the second narrowband optical waveform generates a broadband optical waveform that substantively matches the target broadband waveform.

7. An apparatus comprising:
at least one processor; and
at least one memory including one or more sequences of instructions,
the at least one memory and the one or more sequences of instructions configured to, with the at least one processor, cause the apparatus to perform at least the following:
determine a target broadband waveform;
determine a spectrum and phase for a first narrowband optical waveform; and
determine a spectrum and phase for a second narrowband optical waveform,
wherein a frequency-shifted replica of the first narrowband optical waveform coherently combined with the second narrowband optical waveform generates a broadband optical waveform that substantively matches the target broadband waveform.

8. A method of producing an arbitrary broadband waveform, comprising:
generating a first narrowband waveform;
generating a frequency-shifted replica by frequency shifting the first narrowband waveform by a frequency shift;
generating a second narrowband waveform; and
generating a broadband waveform by combining the frequency-shifted replica and the second narrowband waveform.

9. A method as recited in claim 1, wherein the first narrowband waveform is introduced into an optical ring and the second narrowband waveform is introduced into the same optical ring at a later time.

10. A method as recited in claim 9, wherein generating the frequency shifted replica is performed by a component in the optical ring.

11. A method as recited in claim 9, wherein the optical ring includes an optical fiber as a major portion of the optical path in the optical ring.

12. A method as recited in claim 9, wherein the optical ring introduces a delay time for a photon to circulate in the optical ring greater than about 1 microsecond ($\mu s$, 1 $\mu s=10^{-6}$ seconds).

13. A method as recited in claim 9, wherein each of a first temporal duration of the first narrowband waveform and a second temporal duration of the second narrowband waveform is less than or equal to a delay time for a photon to circulate in the optical ring.

14. A method as recited in claim 1, further comprising: generating a frequency-shifted replica of the broadband waveform; generating a third narrowband waveform; and generating a different broadband waveform by combining the frequency-shifted replica of the broadband waveform and the third narrowband waveform.

15. A method as recited in claim 1, further comprising emitting the broadband waveform as an optical waveform comprising photons.

16. A method as recited in claim 1, further comprising directing the broadband waveform as an optical waveform onto a photodetector to output a broadband electronic signal.

17. A method as recited in claim 1, wherein the broadband waveform has a bandwidth greater than about 10 gigahertz (GHz, 1 GHz=$10^9$ cycles per second, Hertz).

18. An apparatus as recited in claim 5, wherein the means for generating the broadband waveform comprises an optical ring into which both the first narrowband optical waveform and the second narrowband waveform are introduced at different times.

19. A non-transitory computer-readable medium as recited in claim 6, wherein the frequency-shifted replica of the first narrowband optical waveform is coherently combined with the second narrowband waveform after the frequency-shifted replica is delayed by a time greater than about 1 microsecond ($\mu s$, 1 $\mu s=10^{-6}$ seconds).

20. An apparatus as recited in claim 7, wherein the frequency-shifted replica of the first narrowband optical waveform is coherently combined with the second narrowband waveform after the frequency-shifted replica is delayed by a time greater than about 1 microsecond ($\mu s$, 1 $\mu s=10^{-6}$ seconds).

21. A method as recited in claim 8, wherein the first narrowband waveform is introduced into a radio frequency cable ring and the second narrowband waveform is introduced into the same radio frequency cable ring at a later time.

22. A method of producing a broadband waveform, comprising:
generating a plurality of narrowband optical waveforms each with a bandwidth small compared to a bandwidth of the broadband waveform;
introducing the plurality of narrowband optical waveforms into one optical ring at a corresponding plurality of successive times; and
generating the broadband waveform by coherently combining the plurality of narrowband optical waveforms in the optical ring.

23. A method as recited in claim 22, wherein the optical ring includes an optical fiber as a major portion of the optical path in the optical ring.

* * * * *